United States Patent [19]

Tanaka et al.

[11] 4,312,710
[45] Jan. 26, 1982

[54] MULTISTAGE FLASH EVAPORATOR

[75] Inventors: Kazuhiro Tanaka, Koganei; Yutaka Maekawa, Chofu, both of Japan

[73] Assignee: Mitsubishi Jukogyo Kabushiki Kaisha, Japan

[21] Appl. No.: 113,599

[22] Filed: Jan. 21, 1980

[30] Foreign Application Priority Data

Jan. 26, 1979 [JP] Japan ............................. 54/8467[U]

[51] Int. Cl.³ .............................................. C02F 1/06
[52] U.S. Cl. ................................. 202/173; 202/180; 202/197; 202/266; 203/11
[58] Field of Search ............... 202/173, 266, 174, 180, 202/202, 186, 185 R, 197; 159/17 R, DIG. 8, 17 P; 203/11, 73, 88, DIG. 17

[56] References Cited

U.S. PATENT DOCUMENTS

| | | | |
|---|---|---|---|
| 3,180,805 | 4/1965 | Chirico | 202/173 |
| 3,192,131 | 6/1965 | Loebel et al. | 202/173 |
| 3,228,859 | 1/1966 | Frankel et al. | 202/173 |
| 3,326,280 | 6/1967 | Bosquain et al. | 202/173 |
| 3,763,014 | 10/1973 | Barba et al. | 202/173 |
| 3,839,160 | 10/1974 | Izumi | 159/DIG. 8 |

FOREIGN PATENT DOCUMENTS

| | | | |
|---|---|---|---|
| 626023 | 8/1961 | Canada | 202/173 |
| 2750764 | 5/1979 | Fed. Rep. of Germany | 202/173 |
| 2070511 | 9/1971 | France | 202/173 |

Primary Examiner—Wilbur L. Bascomb, Jr.
Attorney, Agent, or Firm—McGlew and Tuttle

[57] ABSTRACT

An improved multistage flash evaporator comprises a plurality of cylindrical shells parallelly and horizontally extending in spaced relation, tube sheets in pairs supported by opposite end portions of the cylindrical shells, each pair of the sheets holding a bundle of cooling tubes therebetween, a top plate connecting the upper portions of the shells to one another, internal bulkheads connecting the lower portions of the shells to a bottom plate, and demisters mounted between the shells, whereby the bulkheads are reduced in height and wall thickness to an economic advantage as compared with the conventional bulkheads, and the demisters are made adjustable in surface areas according to the evaporation loads to be encountered.

3 Claims, 9 Drawing Figures

MULTISTAGE FLASH EVAPORATOR

BACKGROUND OF THE INVENTION (1) Field of the Invention

This invention relates to a multistage flash evaporator, and more particularly to such an evaporator which comprises a plurality of horizontally extending cylindrical shells of shell and tube type arrangement provided in parallel spaced relation, tube sheets supported by opposite end portions of the shells, bundles of cooling tubes held between the tube sheets and travelled by cooling water inside, a top plate connecting the upper portions of the shells to one another, internal bulkheads connecting the lower portions of the shells and a bottom plate, and demisters mounted between the shells.

(2) Description of the Prior Art

Conventional multistage flash evaporators are typically as shown in FIGS. 1 to 3. Throughout these figures the vessel is shown built up of plates forming the bottom T, sides S, top V, front W, and rear X. The vessel is partitioned into a number of stages by internal bulk-heads K. The stages thus provided in the multistage flash evaporator include flash chambers A, $A_1$, $A_2$, etc. and condenser chambers B, $B_1$, $B_2$, etc.

Brine, admitted to the vessel through a brine inlet F, then flows in the direction indicated by the arrow into the flash chamber A, where it partly flashes into vapor, and the vapor passes by routes indicated by the dotted-line arrows into the condenser chamber B. Through a heat exchange with cooling water running in a bundle of cooling tubes C, the vapor is condensed to fresh water or plain water and is taken out via a tray G. The trays G are connected to a distillate trough Y, in known fashion, for the common removal of the distillate from the unit. On the other hand, the balance of brine not vaporized in the chamber A passes onward through interstage brine orifices H into the next-stage flash chamber $A_1$, where it is handled in the same way as in the first compartment, and thence the unvaporized brine continues to travel from stage to stage. Throughout these figures the symbol D indicates a tube sheet; E, water chambers; I, demisters; J, vent pipes for noncondensable gases; and L, tube support plates.

The multistage flash evaporators of the ordinary designs have the following disadvantages. The internal bulkheads K, which connect the top plate V and the bottom plate T together, have to be tall accordingly and, in order to stand the vertical loads and the forces that result from the pressure difference between the adjacent flash chambers, they should be sufficiently thick-walled, with additional support by a number of reinforcements. In case of the construction as illustrated in FIG. 2, the width of the flash chamber A is often governed by the area the demister I is to occupy, with consequent increases in the overall dimensions of the apparatus to a disadvantage. The construction shown in FIG. 3, by contrast, permits the installation area of the demister to be changed as desired by upward or downward shifting of the demister position. A disadvantage of this arrangement is the division of the demister into two parts, which necessitates an increased number of component parts. Among other disadvantages are that the divided vapor streams toward the left and right demister parts are likely to deviate from normal courses and that the left demister part I is located so close to the brine orifices H that the flashing brine tends to impinge upon that part and affect it unfavorably.

BRIEF SUMMARY OF THE INVENTION

This invention is now proposed to overcome the foregoing disadvantages of the conventional equipment, and has for an object to provide an economical multistage flash evaporator whose internal bulkheads are reduced in height and wall thickness for a saving of cost, by connecting a common bottom plate and the lower portions of a plurality of horizontally extending cylindrical shells arranged in parallel and in spaced relation.

Another object of the invention is to provide a multistage flash evaporator in which demisters are mounted between the cylindrical shells in such a manner that the height and position of each demister can be shifted to obtain a suitable demister surface area for the evaporation load to be handled, whereby the necessity of increasing the width of each flash chamber is precluded.

DETAILED DESCRIPTION OF THE INVENTION

Figure 5:
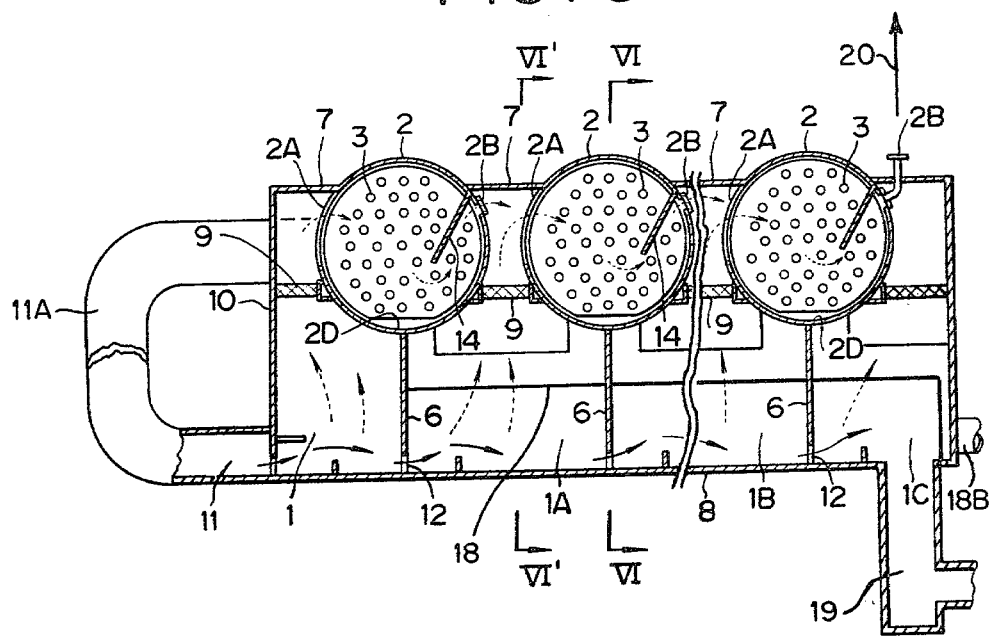
FIG. 5 is a partial cross-sectional view of the first embodiment of the present invention.
Figure 6:
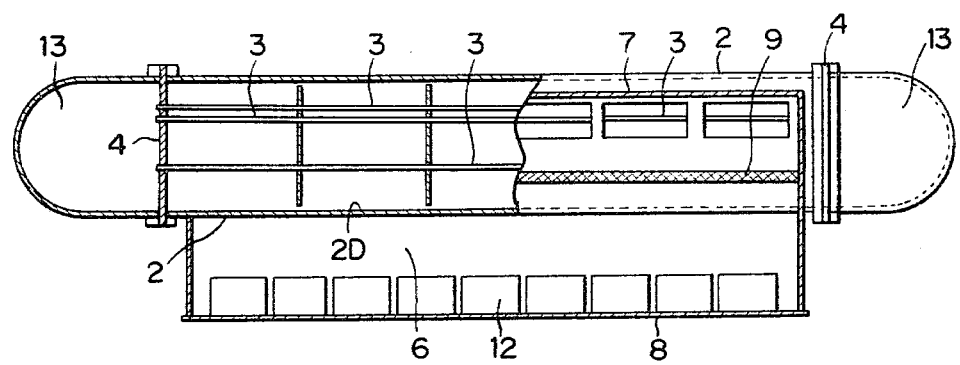
FIG. 6 is a longitudinal sectional view, the left and right halves of which being taken, respectively, along the lines VI—VI and VI'—VI' of FIG. 5.

The first embodiment:

Referring now to FIGS. 5 and 6, there are shown flash chambers 1, 1A, 1B, 1C, etc. and cylindrical shells 2 each of which contains a bundle of cooling tubes 3 set at both ends in tube sheets 4, which in turn are held upright in opposite end portions of the shell. The cylindrical shells 2 are arranged horizontally and parallelly in spaced relation, and their upper portions are connected to one another by a single top plate 7.

The lower portions of the shells 2 and a single bottom plate 8 are connected by internal bulkheads 6. Each of demisters 9, consisting of a mass of wire mesh, steel wool, or other similar vapor-pervious material shaped into a plate form, is located between adjacent shells 2. The cylindrical shells 2 are formed with openings 2A and vents 2B. Also shown are trays 2D, a side plate 10, a brine inlet 11, interstage brine orifices 12, water chambers 13, and baffles 14.

Brine that enters the evaporator at the inlet 11 then flashes into vapor in the flash chamber 1. The resulting vapor flows upwardly in the directions indicated by the dotted-line arrows through the demister 9 and the opening 2A into the cylindrical shell 2, where it passes off the heat to the cooling water, e.g., seawater, running through the cooling tubes 3 and then condenses on the tube surfaces to fresh water, which in turn is collected and led through the tray 2D to the outside. Meanwhile, the balance of brine left unvaporized in the flash chamber 1 flows through the interstage brine orifices 12 into the flash chamber 1A of the next stage, where it is again subjected to flash evaporation in the same manner, and thence unvaporized brine moves further to the successive stages. Noncondensable gases left behind in the first cylindrical shell 2 flow out of it via the vent 2B into the next-stage flash chamber 1A.

Figure 7:
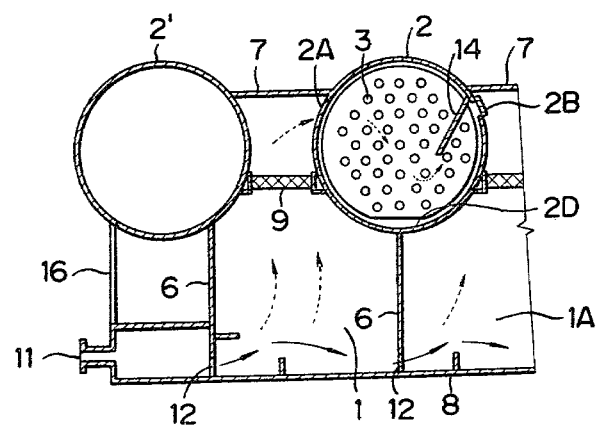
FIG. 7 is a partial cross-sectional view of the second embodiment of the invention.

The second embodiment:

As shown in FIG. 7, the second embodiment is built in the same way as the first, with the exception that a topmost or initial cylindrical shell is added as a heater 2' in which vapor is introduced to heat the cooling water so that the shell can serve as a brine heater. The numeral 16 designates stanchions supporting the heater 2'.

Figure 8:
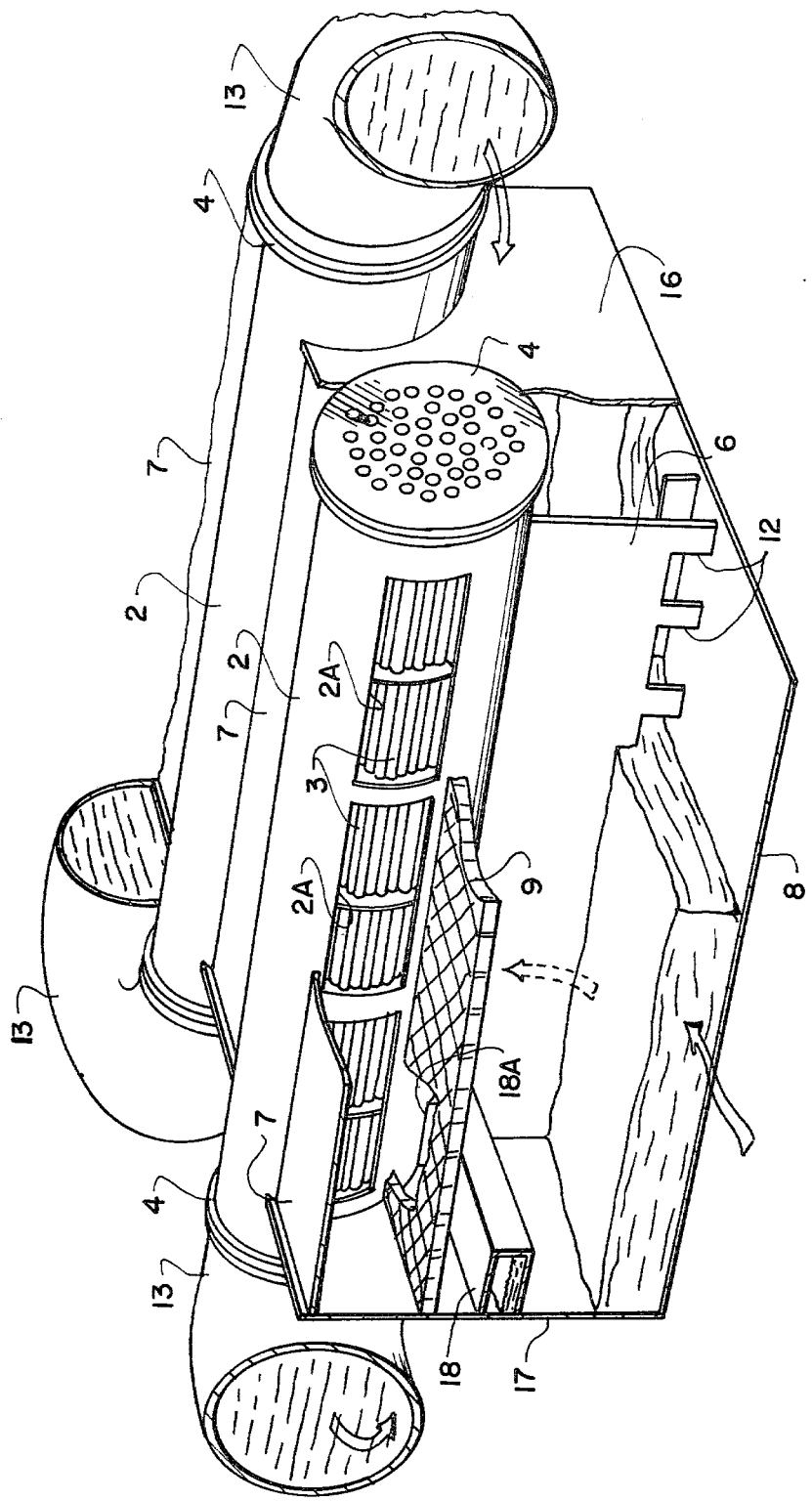
FIG. 8 is a perspective partial view with portions cut away for clarity of the flash evaporator according to the invention.
Figure 9:
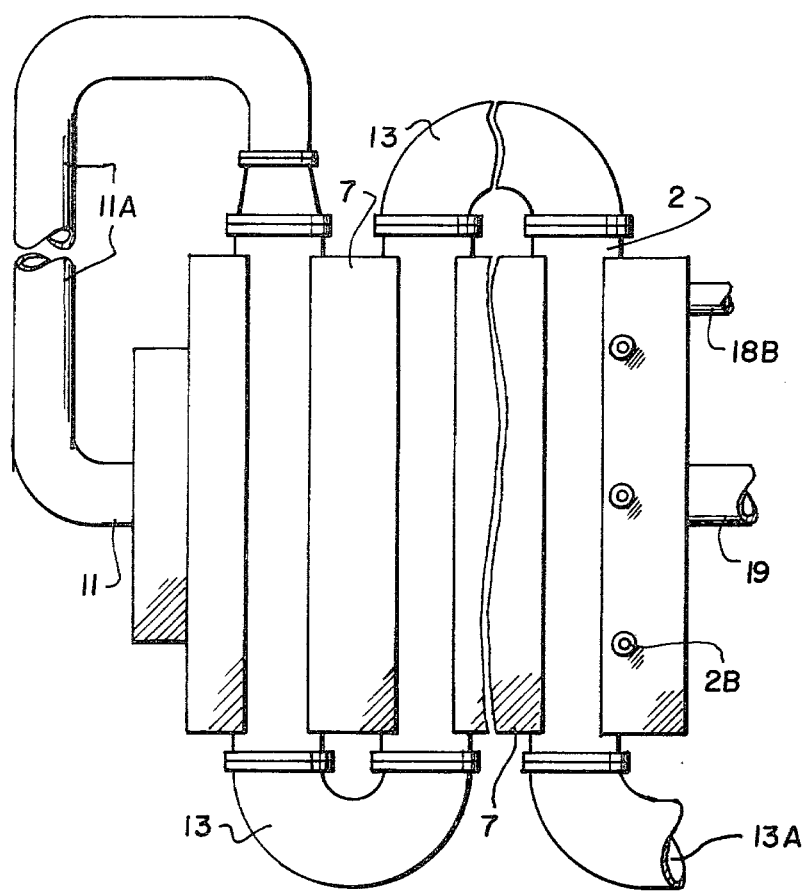
FIG. 9 is a top plan view of the invention as shown in FIG. 5.

Turning to FIGS. 5, 8 and 9, specifically, the flash evaporator according to the invention utilizes sea water or the like which is supplied to the upstream-most water chamber 13A, which acts as a coolant medium inlet. The sea water then travels the tubes between the tube plates 4 and to the next downstream water chamber 13. The water thus proceeds across the plurality of cylindrical shells 2 until it reaches the final downstream-most water chamber which is connected through a conduit 11A to the liquid inlet 11 which receives the now preheated sea water and supplies it to the upstream-most flash chamber 1. If, at the last flash chamber 1C, any sea water remains, it is discharged through a liquid outlet 19. As the sea water evaporates in each flash chamber, it rises through the unit and enters into each cylindrical shell through opening 2A. The vapor is condensed on tubes 3 and falls into distillate tray 2D defined at the bottom of each shell. As shown particularly in FIGS. 5 and 8, the flash evaporator is provided with a distillate trough 18 which extends across each of the flash chambers and is connected through an extension 18A to each of the distillate trays 2D. The downstream-most end of the distillate trough 18 is provided with a distillate outlet 18B. The trough and outlet thus comprise distillate recovery and discharge means for the unit. If any vapor remains after the last shell 2, it is discharged in the direction of arrow 20 from a downstream-most vapor vent 2B shown on the right-hand end of FIG. 5.

With the construction so far described the multistage flash evaporator according to the present invention offers the following advantages:

(1) The internal bulkheads, set upright to connect the lower portions of the horizontal cylindrical shells and the bottom plate of the apparatus, are lower in height and thinner in thickness compared with the conventional thereby providing more economical.

(2) Because the demisters are directly mounted between the cylindrical shells, their surface areas can be changed as desired by shifting their height and position, in other words each demister area can be decreased by raising the mounting position or increased by lowering the position. Thus, the demister areas are simply adjustable according to the evaporation loads to be encountered, and there is no need of increasing the width of each flash chamber to obtain a larger demister area.

(3) The cylindrical shells, tube sheets, and cooling tubes can be separately fabricated as unit parts and assembled together, and this facilitates the manufacture, transportation, and erection at site of the apparatus.

Figure 1:
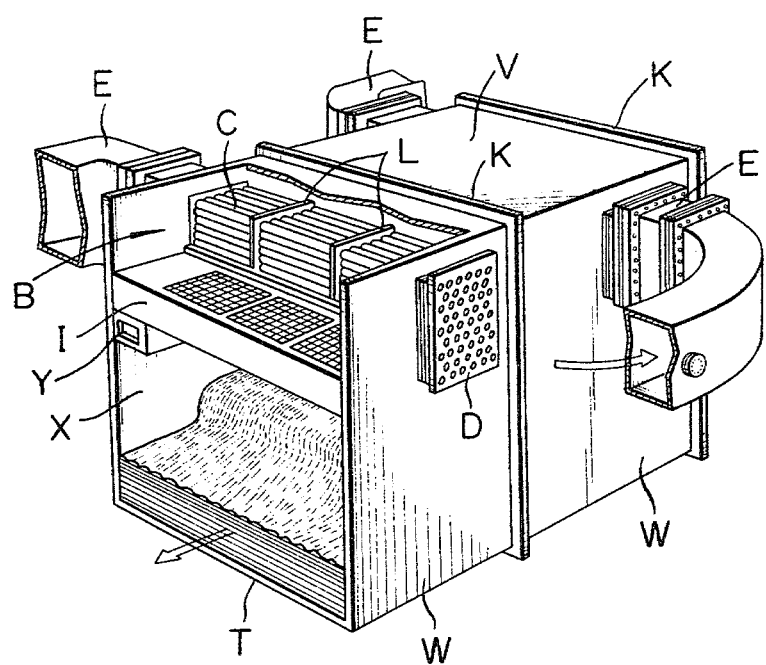
FIG. 1 is a perspective view of a conventional multistage flash evaporator, partly cut away to show the interior construction.
Figure 2:
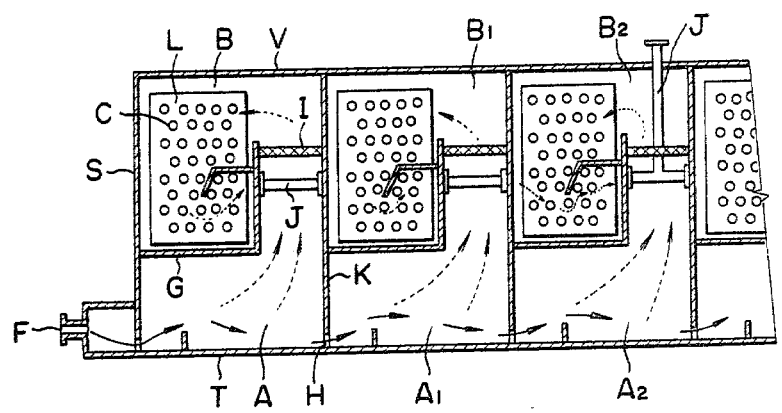
FIG. 2 is a partial cross-sectional view of the conventional multistage flash evaporator.
Figure 3:
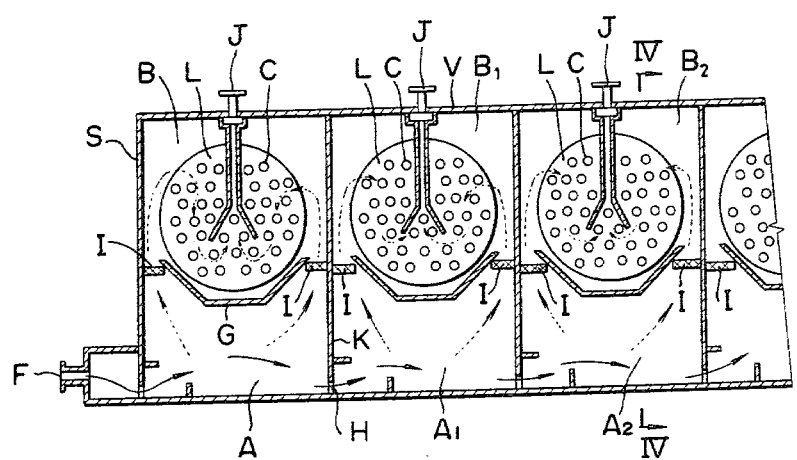
FIG. 3 is a partial cross-sectional view of another multistage flash evaporator of the prior art.
Figure 4:
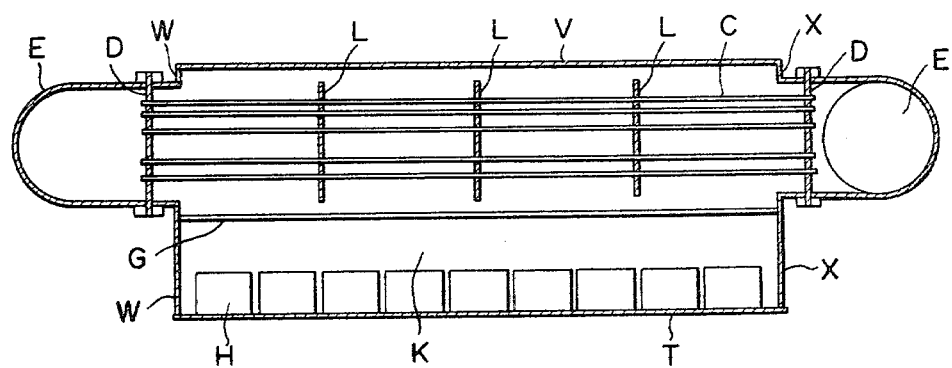
FIG. 4 is a longitudinal sectional view taken along the line IV—IV of FIG. 3.

(4) As compared with the tube sheets of the conventional equipments that are supported, as shown in FIG. 4, by the front plates W and the rear plates X, those of the present invention are supported by the opposite end portions of the cylindrical shells themselves as shown in FIG. 6. Consequently, the forces exerted on the tube sheets are borne by the entire shells, and this arrangement adds to the strength of the whole structure.

What is claimed is:

1. A multistage flash evaporator comprising:
a front wall;
a back wall spaced from said front wall;
a bottom wall connected to the front and back walls defining a space;
a plurality of parallel spaced cylindrical shells extending horizontally through said front and back walls, each having a steam intake opening on one side thereof and a steam output opening on another side thereof;
a tube sheet connected to each opposite end of each of said shells;
a plurality of cooling tubes connected between each tube sheet of each shell for receiving a flow of cooling medium flowing in a cooling medium flow direction;
a top wall connected between adjacent shells above said openings of each shell;
a water chamber member connected between adjacent ends of adjacent shells, with one end of each shell connected to an upstream shell and an opposite end connected to a downstream shell in the flow direction of the cooling medium with an upstream-most water chamber forming a cooling medium inlet and a downstream-most water chamber forming a cooling medium outlet;
a vertically extending bulkhead connected to each shell on an axial line on a lower outer surface of each shell, to said bottom wall and to said front and back walls dividing the space into a plurality of flash chambers in series;
a demister connected to adjacent shells below said openings thereof defining an upper part of each flash chamber;
said bulkheads defining passages between adjacent flash chambers for the movement of a liquid to be flash evaporated between adjacent flash chambers in said series, in a liquid flow direction;
an upstream-most flash chamber in said series having a liquid inlet and a downstream-most flash chamber in said series having a liquid outlet for liquid that has not evaporated;
a lower part of each of said shells defining a distillate tray; and
distillate recovery means connected to each of said trays for collecting and discharging the distillate.

2. A multistage flash evaporator according to claim 1, including a baffle extending at an angle into the interior of each shell adjacent each vent opening.

3. A multistage flash evaporator according to claim 1, wherein said passage defined between adjacent flash chambers comprises at least one opening through each bulk-head adjacent said bottom wall.

* * * * *